United States Patent
Ogawa et al.

(10) Patent No.: US 6,790,883 B2
(45) Date of Patent: Sep. 14, 2004

(54) COMPOSITION FOR POLISHING PAD AND POLISHING PAD USING THE SAME

(75) Inventors: Toshihiro Ogawa, Tokyo (JP); Kou Hasegawa, Tokyo (JP); Nobuo Kawahashi, Tokyo (JP)

(73) Assignee: JSR Corporation, Tokyo (JP)

( * ) Notice: Subject to any disclaimer, the term of this patent is extended or adjusted under 35 U.S.C. 154(b) by 104 days.

(21) Appl. No.: 09/867,541

(22) Filed: May 31, 2001

(65) Prior Publication Data

US 2002/0010232 A1 Jan. 24, 2002

(30) Foreign Application Priority Data

May 31, 2000 (JP) ........................................ 2000-161520

(51) Int. Cl.⁷ ............................ C08L 3/00; C08L 89/00
(52) U.S. Cl. ............................ 524/47; 524/54; 524/56; 524/43; 524/17; 524/503; 524/599; 524/413
(58) Field of Search .............................. 524/54, 56, 43, 524/47, 17, 503, 599, 413

(56) References Cited

U.S. PATENT DOCUMENTS

| | | | |
|---|---|---|---|
| 2,701,191 A | | 2/1955 | Laliberte |
| 5,523,331 A | | 6/1996 | Ezoe |
| 6,080,221 A | * | 6/2000 | Moore .......................... 71/11 |
| 6,245,861 B1 | * | 6/2001 | Class ...................... 525/332.5 |

FOREIGN PATENT DOCUMENTS

| | | |
|---|---|---|
| JP | 8-500622 | 1/1996 |
| JP | 2000-33552 | 2/2000 |
| JP | 2000-34416 | 2/2000 |
| WO | WO 94/04599 | 3/1994 |

OTHER PUBLICATIONS

Patent Abstracts of Japan, JP 61–111343, May 29, 1986.
Derwent Abstract, AN 1992–019219, JP 3–266706, Nov. 27, 1991.

* cited by examiner

Primary Examiner—James J. Seidleck
Assistant Examiner—U. K. Rajguru
(74) Attorney, Agent, or Firm—Oblon, Spivak, McClelland, Maier & Neustadt, P.C.

(57) ABSTRACT

An object of the invention is to provide a polishing pad having the excellent slurry retaining properties and the large removal rate and a composition for a polishing pad which can form such the polishing pad. A composition for polishing pad of the invention is comprising a water-insoluble matrix material containing a crosslinked polymer and a water-soluble particle dispersed in the water-insoluble matrix material. The elongation remaining after breaking is 100% or less when a test piece comprising the water-insoluble matrix material is broken at 80° C. according to JIS K 6251. A polishing pad of the invention is that at least a part of the polishing pad comprises the composition for polishing pad.

18 Claims, No Drawings

COMPOSITION FOR POLISHING PAD AND POLISHING PAD USING THE SAME

BACKGROUND OF THE INVENTION

1. Field of the Invention

The present invention relates to a composition for a polishing pad and a polishing pad using the same, and this polishing pad can be suitably utilized for polishing the surface of semiconductor wafer and the like.

2. Description of the Related Art

As a method for polishing which can form the surface having the high flatness, an attention has been recently paid to CMP (Chemical Mechanical Polishing). In CMP, polishing is performed by flowing down a slurry which is an aqueous dispersion in which abrasives are dispersed to the surface of a polishing pad from an upper side while sliding a polishing pad and a side to be polished.

A factor which has a great influence on the productivity in this CMP is the removal rate and, this removal rate is expected to be improved remarkably by setting at a greater amount of the retained slurry than previously used amount.

Hitherto, in CMP, a polyurethane foam containing fine air bubbles has been used as a polishing pad, and polishing has been performed by retaining a pore opened on the surface of this resin (hereinafter, referred to as "pore").

However, in the polyurethane foam, it is difficult to control the foaming freely, and it is extremely difficult to control a size of foamed air bubbles, a foam density, and the like through the foam uniformly. As a result, the quality of a polishing pad comprising a polyurethane foam varies, leading to the cause for the varied removal rate and the procession state.

As a polishing pad in which controlling of a pore is easier upon this foaming, there are known soluble materials dispersed in a number of resins described in Japanese Patent laid-open publication Hei 8-500622, Japanese Patent laid-open publication 2000-34416 and Japanese Patent laid-open Publication 2000-33552, and the like. Among them, the effectiveness of a polishing pad containing solubles materials is suggested in Japanese Patent laid-open publication Hei 8-500622 and Japanese Patent laid-open publication 2000-33552. However, a matrix material is not studied when it is actually used as a polishing pad.

In addition, a component material is studied in Japanese Patent laid-open publication 2000-34416 and the more stable polishing and an improvement in the removal rate are recognized but a further improvement in the slurry retaining properties and the polishing rate is required.

SUMMARY OF THE INVENTION

The present invention was done in view of the aforementioned circumstances, and an object of the present invention is to provide a polishing pad which has the great removal rate due to the excellent slurry retaining properties, and can effectively prevent a decrease in the retaining properties and the removal rate during polishing and even after dressing, and a composition for a polishing pad which can form such the polishing pad.

The present inventors studies in detail the mechanism by which the slurry retaining properties and the removal rate are gradually decreased during polishing, and the mechanism in dressing in which a pore is formed (face forming) or updated (face updating) on the surface of a polishing pad with a diamond whetstone and the like. As a result, we found that, when shear stress is exerted on the previous polishing pad surface by the polishing, dressing and the like, an elongation produced on the surface of a matrix material which is a main component material and, thereafter, the surface is deformed plastically and, thus, a pore is choked. Further, we found that since dusts of not only surface of a wafer but also a matrix material itself are produced, these dusts also choke a pore. That is, we found that a sufficient improvement in the removal rate can not be effected for these causes and, as a method for preventing them, the use of a material having the cross-linking structure manifesting the elastic recovery in a matrix material is effective, which resulted in completion of the present invention.

The present invention is based on the findings described above and can be described as follows.

1. A composition for a polishing pad which comprises a water-insoluble matrix material containing a crosslinked polymer and a water-soluble particle dispersed in the water-insoluble matrix material.
2. The composition for a polishing pad according to 1 above, wherein the elongation remaining after breaking is 100% or less when a test piece comprising the water-insoluble matrix material is broken at 80° C.
3. The composition for a polishing pad according to 2 above, wherein said water-insoluble matrix material is modified with at least one selected from the group consisting of an acid anhydride group, a carboxyl group, a hydroxyl group, an epoxy group and an amino group.
4. The composition for a polishing pad according to 3 above, wherein said water-soluble particle is an organic water-soluble particle comprising at least one selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, and/or an inorganic water-soluble particle comprising at least one selected from the group consisting of potassium acetate, potassium nitrate, potassium carbonate, potassium bicarbonate, potassium chloride, potassium bromide, potassium phosphate and magnesium nitrate.
5. The composition for a polishing pad according to 4 above, wherein the amount of said water-soluble particles is 10 to 90% by volume based on 100% by volume as the total amount of said water-insoluble matrix material and said water-soluble particles.
6. The composition for a polishing pad according to 1 above, wherein at least a part of said crosslinked polymer is a crosslinked rubber.
7. The composition for a polishing pad according to 6 above, wherein at least a part of said crosslinked rubber is crosslinked 1,2-polybutadiene.
8. The composition for a polishing pad according to 7 above, wherein said water-insoluble matrix material is modified with at least one selected from the group consisting of an acid anhydride group, a carboxyl group, a hydroxyl group, an epoxy group and an amino group.
9. The composition for a polishing pad according to 8 above, wherein said water-soluble particle is an organic water-soluble particle comprising at least one selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, and/or an inorganic water-soluble particle comprising of at least one selected from the group consisting of potassium acetate, potassium nitrate, potassium carbonate, potassium bicarbonate, potassium chloride, potassium bromide, potassium phosphate and magnesium nitrate.

10. The composition for a polishing pad according to 9 above, wherein the amount of said water-soluble particles is 10 to 90% by volume based on 100% by volume as the total amount of said water-insoluble matrix material and said water-soluble particles.

11. The composition for a polishing pad according to 1 above, wherein said water-soluble particle is provided with an outer shell for inhibiting moisture absorption in at least a part of the outermost part.

12. The composition for a polishing pad according to 11 above, wherein said water-soluble particle is an organic water-soluble particle comprising of at least one selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, and/or an inorganic water-soluble particle comprising of at least one selected from the group consisting of potassium acetate, potassium nitrate, potassium carbonate, potassium bicarbonate, potassium chloride, potassium bromide, potassium phosphate and magnesium nitrate.

13. The composition for a polishing pad according to 12 above, wherein the amount of said water-soluble particles is 10 to 90% by volume based on 100% by volume as the total amount of said water-insoluble matrix material and said water-soluble particles.

14. A polishing pad characterized in that at least a part of said polishing pad comprises the composition of a water-insoluble matrix material containing a crosslinked polymer and a water-soluble particle dispersed in the water-insoluble matrix material.

15. A polishing pad according to 14 above, wherein the elongation remaining after breaking is 100% or less when a test piece comprising the water-insoluble matrix material is broken at 80° C.

16. A polishing pad according to 15 above, wherein the Shore D hardness is 35 or more.

According to the present invention, there can be obtained a composition for a polishing pad which can afford a polishing pad in which a pore is formed in the better state, a pore is not choked even by dressing, and the slurry retaining properties are better. And also, there can be obtained a composition for a polishing pad in which a water-soluble particle contained in said polishing pad does not absorb moisture and is not swollen, and which can afford a polishing pad having the high hardness. In addition, according to the invention, there can be obtained a polishing pad which can perform polishing at the high removal rate.

DETAILED DESCRIPTION OF THE INVENTION

A composition for a polishing pad of the present invention is characterized in that it contains a water-insoluble matrix material containing a crosslinked polymer and a water-soluble particle dispersed in the water-insoluble matrix material.

A water-soluble particle is dispersed and contained in the whole of aforementioned "water-insoluble matrix material" (hereinafter, simply referred to as "matrix material"). And, in a polishing pad obtained from the present composition for a polishing pad, a pore is formed by dissolving a water-soluble particle present on its most superficial layer by contacting with water. A pore has the functions of retaining the slurry and causes the polishing dusts to be transiently retained. The "water-soluble particle" is dissolved or swollen by contacting with the slurry which is an aqueous dispersion in a polishing pad, and exits from a matrix material. The matrix material may be modified with an acid anhydride group, a carboxyl group, hydroxyl group, an epoxy group, an amino group or the like. This modification can regulate the affinity with a water-soluble particle and the slurry.

The "crosslinked polymer" constitutes a matrix material and imparts a matrix material with the elastic recovery by the existence of the cross-linking structure. The inclusion of the crosslinked polymer can suppress to a small level a displacement by shear stress exerted on a polishing pad during polishing, and can effectively suppress excessive stretching of a matrix material during polishing and during dressing and consequent plastic deformation to choke a pore, and fuzz of the surface of polishing pad, and the like. Therefore, a pore is effectively formed, a decrease in the slurry retaining during polishing is small, and fuzz is small, leading to no adverse effect on the polishing flatness It is preferable that this matrix material has the elongation remaining after breaking (hereinafter, simply referred to as "breaking remaining elongation") of 100% or smaller when a test piece comprising a matrix material is broken at 80° C. according to JIS K 6251. That is, it is preferable that a total distance between marked lines after breaking is 2-fold or less of a distance between marked lines before breaking. It is preferable that this breaking remaining elongation is 30% or smaller, (more preferably 10% or smaller, particularly preferably 5% or smaller, usually 0% or more). When the breaking remaining elongation exceeds 100%, fine pieces which have been scraped from the polishing pad surface or stretched during polishing and during face updating tend to easily choke a pore, being not preferable.

The "breaking remaining elongation" is an elongation obtained by subtracting a distance between marked lines before a test from a total distance from a marked line to a broken part of respective test pieces fragmented by breaking when a test piece is broken by a tensile testing machine at a stretching rate of 500 mm/min. and a test temperature of 80° C. using a test piece shape of dumbbell No.3 according to JIS K 6251 "Method for Tensile Test of Vulcanized Rubber". Since the heat is produced by sliding in the actual polishing, a test was performed at a temperature of 80° C.

Examples of such the crosslinked polymer include curable resins which are crosslinked by using as a part of a monomer a polyfunctional monomer such as an urethane resin, an epoxy resin, an acrylic resin, an unsaturated polyester resin, vinyl ester resin, and the like and applying the external energy such as heat and the like, crosslinked rubbers obtained by cross-linking-reacting butadiene rubber, 1, 2-polybutadiene, isoprene rubber, acrylic rubber, acrylonitrile-butadiene rubber, styrene-butadiene rubber, ethylene-propylene rubber, silicone rubber, fluorine rubber, styrene-isoprene rubber and the like, polymers obtained by cross-linking polyethylene, polyvinylidene fluoride, and the like (by a cross-linking agent, or irradiation with ultraviolet rays or electrons or the like), ionomer and the like. These may be used alone or as a mixture of 2 or more of them.

Among them, the use of a crosslinked rubber is preferable because the crosslinked rubber is stable to strong acids or strong alkalis contained in the many slurries and hardly is softened by water absorption. An amount of the crosslinked rubber contained in a crosslinked polymer may be selected appropriately, or the entire crosslinked polymer may be composed of a crosslinked rubber, or the crosslinked polymer may be a mixture with other aforementioned crosslinked polymers. Among these crosslinked rubbers, rubbers crosslinked using organic peroxides are preferable. It is preferable to use 1, 2-polybutadiene. 1, 2-polybutadiene is preferable because a rubber having the higher hardness is easily obtained as compared with other crosslinked rubbers.

On the other hand, examples of a water-soluble particle dispersed in a matrix material include not only particles which are completely dissolved in water when contacted with it but also particles which contain water or the like and, as a result, are swollen into the gel and, whereby, are released from a matrix material. Further, examples of a water-soluble particle include not only particles which are dissolved in or swollen with water but also particles which are dissolved or swollen when contacted with an aqueous mixed medium containing an alcohol solvent such as methanol or the like.

Examples of such the water-soluble particle include organic water-soluble particles and inorganic water-soluble particles. Examples of the organic water-soluble particle include particles made of dextrin, cyclodextrin, mannit, saccharides (lactose and the like), celluloses (hydroxypropylcelluloses, methylcelluloses, and the like), starch, protein, polyvinyl alcohol, polyvinyl pyrrolidone, polyacrylic acid, polyethylene oxide, water-soluble photosensitive resin, sulfonated polyisoprene, sulfonated polyisoprene copolymer, and the like. Further, examples of the inorganic water-soluble particle include particles formed of potassium acetate, potassium nitrate, potassium carbonate, potassium bicarbonate, potassium chloride, potassium bromide, potassium phosphate, magnesium nitrate, and the like. These water-soluble particles may contain the aforementioned respective materials alone or in combination of 2 or more of them. Moreover, the water-soluble particle may be one kind of water-soluble particle composed of a prescribed material or 2 or more kinds of water-soluble particles composed of different materials.

In addition, it is preferable that this water-soluble particle has a particle size of 0.1 to 500 $\mu$m (more preferably 0.5 to 100 $\mu$m) When a particle size is less than 0.1 $\mu$m, since a size of a formed pore is smaller than that of an abrasive used, there is a tendency that a polishing pad which can sufficiently retain the slurry is difficult to obtain. On the other hand, a particle size exceeds 500 m$\mu$, since a size of a formed pore is excessive, there is a tendency that the mechanical strength and the removal rate of the resulting polishing pad are reduced.

Moreover, it is preferable that the content of this water-soluble particle is 10 to 90% by volume (more preferably 15 to 60% by volume, more preferably 20 to 40% by volume) when a sum of a matrix material and a water-soluble particle is regarded as 100% by volume. When the content of a water-soluble particle is less than 10% by volume, a pore is not sufficiently formed in the resulting polishing pad and there is a tendency that the removal rate is reduced. On the other hand, when a water-soluble particle is contained at an amount of over 90% by volume, there is a tendency that a water-soluble particle present in the interior of the resulting polishing pad can not be sufficiently prevented from swelling or dissolving and it becomes difficult to retain the hardness and the mechanical strength of a polishing pad at an appropriate value.

In addition, it is preferable that a water-soluble particle is dissolved in water only when exposed on the superficial layer in a polishing pad, and, in the interior of a polishing pad, a water-soluble particle absorbs moisture and is not further swollen. For this reason, it is preferable that a water-soluble particle is provided with an outer shell which inhibits moisture absorption in at least a part of the outermost part. This outer shell may be physically absorbed onto a water-soluble particle, or chemically bound with a water-soluble particle, or may be contacted with a water-soluble particle by both physical absorption and chemical binding. Examples of a material which forms an outer shell include epoxy resin, polyimide, polyamide, polysilicate, and the like. Even when this outer shell is formed on a part of a water-soluble particle, the aforementioned effects can be sufficiently obtained.

This water-soluble particle has the function of increasing an indentation hardness of a polishing pad (for example, the Shore D hardness 35 to 100) in a polishing pad in addition to the function of forming a pore. The greater indentation hardness can increase a pressure loaded to the surface of a polishing wafer in a polishing pad. For this reason, the removal rate can be improved and, at the same time, the high polishing flatness can be obtained. Therefore, it is particularly preferable that this water-soluble particle is a solid material which can maintain the sufficient indentation hardness in a polishing pad.

In the invention, in order to control the affinity of a matrix material with a water-soluble particle as well as the dispersibility of a water-soluble particle in a matrix material, a compatibilizer may be blended therein. Examples of the compatibilizer include block polymer such as styrene-butadiene-styrene block polymer and the like, random copolymer such as styrene-butadiene copolymer, polymer modified with an acid anhydride group, a carboxyl group, a hydroxyl group, an epoxy group, an oxazoline group, an amino group, and the like, as well as various nonionic surface active agent, coupling agent such as silane coupling agent and the like.

In addition, a matrix material may contain at least one of abrasive, oxidizing agent, polyvalent metal ions, hydroxide and acid of alkali metal, pH adjusting agent, surfactant, scratch preventing agent, and the like which have been previously contained in the slurry in addition to a water-soluble particle. This makes it possible to perform polishing by supplying only water during polishing when a polishing pad formed from this composition for a polishing pad is used.

The abrasive may be inorganic particles, organic particles and organic/inorganic composite particles. As inorganic particles there may be used particles composed of silicon or metal oxides such as silica, alumina, ceria, titania, zirconia, iron oxide, manganese oxide or the like.

As organic particles there may be used particles composed of thermoplastic resins such as (1) polystyrene and styrene-based copolymers, (2) (meth)acrylic resins such as polymethyl methacrylate, and acrylic-based copolymers, (3) polyvinyl chloride, polyacetals, saturated polyesters, polyamides, polyimides, polycarbonates and phenoxy resins, and (4) polyolefins such as polyethylene, polypropylene, poly-1-butene, poly-4-methyl-1-pentene, and olefin-based copolymers.

Also, the organic particles, a polymer with a crosslinked structure obtained by copolymerization of styrene, methyl methacrylate or the like with divinylbenzene, ethyleneglycol dimethacrylate or the like may also be used. The degree of crosslinking can be used to adjust the hardness of the organic particles.

There may also be used organic particles composed of thermosetting resins such as phenol resins, urethane resins, urea resins, melamine resins, epoxy resins, alkyd resins and unsaturated polyester resins.

These inorganic particles and organic particles may be used alone or in combinations of two or more.

Organic/inorganic composite particles is not particularly limited, the organic/inorganic composite particles may have the organic particles and inorganic particles formed integrally to an extent so as not to easily separate during the polishing process, and there are no particular restrictions on their types or structures.

As composite particles there may be used particles formed by polycondensation of an alkoxysilane, aluminum alkoxide, titanium alkoxide or the like in the presence of polymer particles of polystyrene, polymethyl methacrylate or the like, and bonding of polysiloxane or the like on at least the surface of the polymer particles. The resulting polycondensate may be directly bonded to the functional group of the polymer particles, or it may be bonded via a silane coupling agent or the like.

The polycondensate does not necessarily need to be chemically bonded to the polymer particles, and the three-dimensionally formed polycondensate may by physically held on the surface of the polymer particles. Silica particles or alumina particles may also be used instead of an alkoxysilane. These may also be held by intertwining with the polysiloxane, or they may be chemically bonded to the polymer particles by their functional groups, such as hydroxyl groups.

As examples of specific oxidizing agents there may be mentioned hydrogen peroxide, organic peroxides such as peracetic acid, perbenzoic acid, tert-butylhydroperoxide, and the like, permanganate compounds such as potassium permanganate, and the like, bichromate compounds such as potassium bichromate, and the like, halogenate compounds such as potassium iodate, and the like, nitric compounds such as nitric acid, iron nitrate, and the like, perhalogenate compounds such as perchloric acid, and the like, transition metal salts such as potassium ferricyanide, and the like, persulfuric compounds such as ammonium persulfate, and the like, and heteropoly acids. Particularly preferred among these oxidizing agents are hydrogen peroxide and organic peroxides which contain no metals and whose decomposition products are harmless. Including such oxidizing agents can give an even more vastly improved removal rate.

The content of the oxidizing agent may be preferably 0.01 to 20 parts, more preferably 0.05 to 20 parts and particularly 0.1 to 5 parts, in 100 parts of the non-water-soluable matrix material. Since sufficient improvement in the removal rate can be achieved if the oxidizing agent is added at 0.01 parts, there is no need to add it at greater than 20 parts.

As polyvalent metal ions there may be mentioned metal ions such as aluminum, titanium, vanadium, chromium, manganese, iron, cobalt, nickel, copper, zinc, germanium, zirconium, molybdenum, tin, antimony, tantalum, tungsten, lead and cerium. Any one of these may be used, or two or more polyvalent metal ions may be used in combination.

The polyvalent metal ion content may be up to 3000 ppm, and preferably from 3 to 3000 ppm, in the aqueous dispersion.

The polyvalent metal ion may be produced by mixing with the aqueous medium a salt such as a nitric acid salt, sulfuric acid salt or acetic acid salt or a chelate containing a polyvalent metal element, and it may also be produced by mixing an oxide of a polyvalent metal element. There may also be used a compound that produces a monovalent metal ion when mixed with the aqueous medium, but whose ion becomes a polyvalent metal ion by the oxidizing agent. Of these various salts and chelates, iron nitrate is preferred because of its particularly excellent effect of improving the removal rate.

As alkali metal hydroxides there may be used sodium hydroxide, potassium hydroxide, rubidium hydroxide, cesium hydroxide and the like. And an acid is not particularly restricted, and any organic acid or inorganic acid may be used. As organic acids there may be mentioned para-toluenesulfonic acid, dodecylbenzenesulfonic acid, isoprenesulfonic acid, gluconic acid, lactic acid, citric acid, tartaric acid, malic acid, glycolic acid, malonic acid, formic acid, oxalic acid, succinic acid, fumaric acid, maleic acid and phthalic acid. These organic acids may be used alone or in combinations of two or more. As inorganic acids there may be mentioned nitric acid, hydrochloric acid and sulfuric acid, and any one or more of these may be used. An organic acid and an inorganic acid may also be used in combination.

The contents of these acids may 0.05 to 20 parts, especially 0.1 to 15 parts and more preferably 0.3 to 10 parts in 100 parts of the water-insolublematrix material.

The pH adjustment may be accomplished with an acid such as nitric acid or sulfuric acid, or with an alkali such as pottasium hydroxide, sodium hydroxide or ammonia. Adjustment of the pH of the aqueous dispersion can increase the removal rate, and the pH is preferably determined as appropriate within the range where the abrasive can exist stably in consideration of the electrochemical properties of the working surface, the dispersability and stability of the polymer particles and the removal rate.

As surfactants there may be used cationic surfactants, anionic surfactants or non-ionic surfactants. As cationic surfactants there may be mentioned fatty amines, aliphatic ammonium salts and the like. As anionic surfactants there may be mentioned carboxylic acid salts such as fatty acid soaps and alkylether carboxylic acid salts, sulfonic acid salts such as alkylbenzenesulfonic acid salts, alkylnaphthalene-sulfonic acid salts and α-olefinsulfonic acid salts, sulfuric acid ester salts such as higher alcohol sulfuric acid ester salts and alkylether sulfuric acid salts, and phosphoric acid esters such as alkylphosphoric acid esters and the like.

Particularly preferred as surfactants are non-ionic surfactants because of their notable effect of reducing scratches. As non-ionic surfactants there may be mentioned ethers such as polyoxyethylene alkyl ether, ether esters such as polyoxyethylene ethers of glycerin esters, and esters such as polyethylene glycol fatty acid esters, glycerin esters, sorbitan esters and the like.

The content of the surfactant in the scratch inhibitor comprising a surfactant may be 0.01 to 10 wt %, preferably 0.03 to 5 wt % and more preferably 0.05 to 3 wt %, especially for a non-ionic surfactant. If the surfactant content is less than 0.01 wt %, the generation of scratches may not be sufficiently reduced, and if it exceeds 10 wt % there may be a tendency toward lower heat resistance and coloring resistance of the organic particles.

As scratch inhibitors there may be used at least one from among (1) biphenol, (2) bipyridyl, (3) 2-vinylpyridine and 4-vinylpyridine, (4) salicylaldoxime, (5) o-phenylenediamine and m-phenylenediamine, (6) catechol, (7) o-aminophenol, (8) thiourea, (9) an N-alkyl group-containing (meth)acrylamide, (10) an N-aminoalkyl group-containing (meth)acrylamide, (11) a heterocyclic compound with a heteropentacycle and with no aromatic ring forming the skeleton, (12) a heterocyclic compound with a heteropentacycle and with an aromatic ring forming the skeleton, (13) phthalazine, (14) a compound with a heterohexacycle bearing three nitrogen atoms, (15) a surfactant, and a derivative of any of compounds (1) through (14). As derivatives there may be mentioned these compounds to which are bonded short-chain alkyl groups of 1 to 3 carbons, amino groups, hydroxyl groups, mercapto groups and the like.

These scratch inhibitors may also comprise any desired combinations of two or more from among the compounds of (1) through (14) and their derivatives, and the surfactant of (15).

As heterocyclic compounds with a heteropentacycle and with an aromatic ring forming the skeleton, there may be mentioned 7-hydroxy-5-methyl-1,3,4-triazaindolizine, 3H-1,2,3-triazolo[4, 5-b]pyridin-3-ol, 1H-tetrazole-1-acetic acid, 1-(2-dimethylaminoethyl)-5-mercaptotetrazole, bismuthiol, 4, 5-dicyanoimidazole, adenine, 1-phenyl-5-mercapto-1H-tetrazole, 3-mercapto-1,2,4-triazole, 2-amino-4,5-dicyano-1H-imidazole, 4-amino-1,2,4-triazole, 5-amino-1H-tetrazole, 2-mercaptothiazoline, guanine, 1-phenyl-5-mercapto-1H-tetrazole, 4-amino-3-hydrazino-5-mercapto-1,2,4-triazole, 3-mercapto-4-methyl-4H-1,2,4-triazole, 1H-tetrazole and the like.

As heterocyclic compounds with a heteropentacycle and with an aromatic ring forming the skeleton, there may be mentioned benzotriazoles such as 5-methyl-1H-benzotriazole, tolyltriazole, benzimidazole, benzofloxane, 2,1,3-benzothiadiazole, 2-mercaptobenzothiazole, 2-mercaptobenzothiadiazole, 2-mercaptobenzooxazole, 2-aminobenzothiazole, 2-mercaptobenzothiazole, 2-amino-6-methylbenzothiazole and the like.

As compounds with a heterohexacycle bearing three nitrogen atoms there may be mentioned, melamine, 3-amino-5, 6-dimethyl-1,2,4-triazine, 2,4-diamino-6-diallylamino-1,3,5-triazine, benzoguanamine and thiocyanuric acid.

Among these are preferred 7-hydroxy-5-methyl-1,3, 4-triazaindolizine, 3-mercapto-1,2,4-triazole, 1-phenyl-5-mercapto-1H-tetrazole and 5-methyl-1H-benzotriazole because of their superior effect of reducing scratches, and 7-hydroxy-5-methyl-1, 3,4-triazaindolizine is particularly preferred because of its notable effect of reducing scratches.

The content of the scratch inhibitor comprising these compounds (1) through (14) or their derivatives is preferably 0.001 to 5 wt % referably 0.005 to 2 wt % and even more preferably 0.01 to 1 wt %. If the content is less than 0.001 wt % the generation of scratches may not be sufficiently reduced, and if it exceeds 5 wt % the scratch inhibitor may not dissolve sufficiently and may tend to precipitate.

Further, various additives such as a filler, a softening agent, an antioxidant, an ultraviolet absorbing agent, an antistatic agent, a lubricant, a plasticizer, and the like may be added to the compositions for a polishing pad of the present invention, if necessary. Further, the composition may be reacted and crosslinked by adding a reactive additive such as sulfur, peroxide, and the like. In particular, as a filler, materials which improve the stiffness such as calcium carbonate, magnesium carbonate, talc, clay, and the like, and materials and the like having the polishing effects such as silica, alumina, ceria, zirconia, titanium oxide, ziriconium oxide, manganese dioxide, manganese trioxide, barium carbonate, and the like may be used.

A process for preparing this composition for a polishing pad is not particularly limited. When the process has a kneading step, kneading can be performed by the known kneading machine or the like. Examples of the kneading machine include a roll, a kneader, a Banbury mixer, an extruder (single screw, multiple screws), and the like. The kneaded composition for a polishing pad may be processed into the desired shape such as sheet, block, film, and the like by performing press molding, extrusion molding, injection molding, and the like. In addition, this can be processed into the desired size to obtain a polishing pad.

In addition, a method for dispersing water-soluble particle in a matrix material is not particularly limited but a matrix material, a water-soluble particle and other additives, and the like may be usually kneaded for dispersion. In this kneading, a matrix material is kneaded by heating for easy processing and it is preferable that a water-soluble particle is a solid at a temperature of this time point. When a water-soluble particle is a solid, it becomes easy to disperse a water-soluble particle so that the aforementioned preferable particle size is manifested, regardless of a magnitude of compatibility with a matrix material. Therefore, it is preferable that a kind of a water-soluble particle is selected depending upon a temperature for processing a matrix material used.

A polishing pad of the present invention is characterized in that at least a part of it is composed of the composition for a polishing pad.

It is preferable that the Shore D hardness of the polishing pad of the present invention is 35 or more (usually 100 or smaller, more preferably 50 to 90, more preferably 60 to 85). When this Shore D hardness is less than 35, there is a tendency that a pressure which can be applied to a material to be polished during polishing is decreased, and the removal rate is reduced and the polishing flatness becomes insufficient.

In addition, it is preferable that a size of a pore is 0.1 to 500 $\mu$m (more preferably 0.5 to 100 $\mu$m). When this pore size is less than 0.1 $\mu$m, since a size is smaller than a size of an abrasive, there is a tendency that it becomes difficult to retain an abrasive sufficiently. On the other hand, when a size of a pore exceeds 500 $\mu$m, there is a tendency that it becomes difficult to obtain the sufficient strength and indentation hardness.

In order to improve the dischargeabitliy of the slurry or the like, a groove or a dot pattern may be formed on the surface (polishing side) of the present polishing pad in the prescribed shape. Alternatively, it is possible to obtain a polishing pad exhibiting a multilayer structure such as a polishing pad in which, for example, a softener layer is applied to the back (opposite to the polishing side) of this polishing pad. Moreover, the shape of this polishing pad is not particularly limited but can be appropriately selected from the disc, the belt, the roller shapes, and the like depending upon a polishing apparatus.

Description of the Preferred Embodiments

The present invention will be specifically explained by way of Examples.

Preparation of a composition for a polishing pad and molding of a polishing pad

EXAMPLE 1

100 parts by weight of 1, 2-polybutadiene (manufactured by JSR Co., Ltd., trade name "JSR RB830") which will be a matrix material by cross-linking later and 100 parts by weight of β-cyclodextrin (manufactured by Yokohamakokusai Biokenkyujo K K., trade name "Dexypearl β-100") as a water-soluble particle were kneaded with a kneader heated at 120° C. Thereafter, 0.3 part by weight of an organic peroxide (manufactured by Nihonyushi Co., Ltd., trade name "Perhexin 25B") was added, further kneaded, and reacted to crosslinking and molded at 190° C. for 10 minutes in a mold to obtain a polishing pad having a diameter of 60 cm and a thickness of 2 mm. A volumetric fraction of a water-soluble particle relative to the whole polishing pad (a volumetric fraction of a water-soluble particle relative to a sum of a matrix material and a water-soluble particle like volumetric fraction of a water-soluble particle relative to a sum of acrosslinked polymer and a watersoluble particle) was about 40%.

EXAMPLE 2

100 parts by weight of 1, 2-polybutadiene (manufactured by "JSR Co., Ltd., JSR RB840") which will be a matrix material by crosslinking later and 230 parts by weight of β-cyclodextrin coated with a polypeptide (manufactured by Yokohamakokusai baiokenkyujo Co., Ltd., tradename "Dexypearl β-100") as a water-soluble particle were kneaded with a kneader heated at 120° C. Thereafter, 0.3 part by weight of an organic peroxide (manufactured by Nihonyushi Co., Ltd., trade name "Perhexin 25B") was added, further kneaded, and reacted to crosslink and molded at 190° C. for 10 minutes in a mold to obtain a polishing pad having a diameter of 60 cm and a thickness of 2 mm. A volumetric fraction of a water-soluble particle relative to the whole polishing pad (a volumetric fraction of a water-soluble particle relative to a sum of a matrix material and a water-soluble particle like volumetric fraction of a water-soluble particle relative to a sum of a crosslinked polymer and a water-soluble particle) was about 60%.

Comparative Example 1

100 parts by weight of an ethylene-vinyl alcohol copolymer resin which is a non-crosslinked thermoplastic resin (manufactured by Kurare Co., Ltd., trade name "Evar EP-F101") and 100 parts by weight of β-cyclodextrin (manufactured by Yokohamakokusai biokenkyujo Co., Ltd., trade name "Dexypearl β-100") as a water-soluble particle were kneaded with a kneader heated at 200° C., and heat-pressed to mold at 200° C. to obtain a polishing pad having a diameter of 60 cm and a thickness of 2 mm. A volumetric fraction of a water-soluble particle relative to the whole polishing pad (a volumetric fraction of a water-soluble particle relative to a sum of a matrix material and a water-soluble particle like volumetric fraction of a water-soluble particle relative to a sum of a crosslinked polymer and a water-soluble particle) was about 44%.

Comparative Example 2

1, 2-polybutadiene and β-cyclodexitrine as in Example 1 were kneaded, and press-molded at 120° C. without crosslinking reaction to obtain a polishing pad having a diameter of 60 cm and a thickness of 2 mm. A volumetric fraction of a water-soluble particle relative to the whole polishing pad (a volumetric fraction of a water-soluble particle relative to a sum of a matrix material and a water-soluble particle like volumetric fraction of a water-soluble particle relative to a sum of a crosslinked polymer and a water-soluble particle) was about 40%.

Polishing Assessment of Polishing Performance

Respective polishing pads obtained in Examples 1 and 2 and Comparative Examples 1 and 2 were mounted on a surface plate of a polishing machine (manufactured by SFT Corp., model "Lapmaster LM-15"), and a silica membrane wafer was polished under the conditions of the flat surface rotation number of 50 rpm and the slurry flow rate of 100 cc/min. to assess the difference in the polishing performance of each polishing pad and the result thereof are shown Table 1. The removal rate was obtained by measuring a change in a membrane thickness with an optical membrane thickness measuring machine.

Further, the surface of a polishing pad was subjected to dressing (grinding with #400 diamond whetstone for 5 minutes) and, thereafter, the state of a pore on this surface was observed with an electron microscope. This result is also shown in Table 1. "O" in Table 1 indicates that a better pore can be confirmed and "X" indicates that a part of a pore is choked.

TABLE 1

|  | Example | | Comparative example | |
| --- | --- | --- | --- | --- |
|  | 1 | 2 | 1 | 2 |
| Removal rate (μm/min.) | 190 | 250 | 60 | 10 |
| State of a pore | o | o | x | x |
| Breaking elongation (%) | 100 | 100 | >600 | >600 |
| Breaking remaining elongation (%) | 0 | 0 | 510 | 220 |

In order to measure the breaking remaining elongation of matrix materials used in Examples 1 and 2 and Comparative Examples 1 and 2, materials from which a water-soluble particle is omitted from respective Examples 1 and 2 and Comparative Examples 1 and 2 were kneaded and molded similarly to make sheets. The sheets were cut into the dumbbell No.3 test piece shape shown in JIS K 6251 to obtain test pieces.

These respective test pieces were stretched to break at a distance between marked lines of 20 mm, a stretching rate of 500 mm/min. and a test temperature of 80° C. according to JIS K 6251, and the breaking remaining elongation was calculated based on the aforementioned standard. In a test piece which did not break even when stretched to a maximum 600%, the piece was forced to cut at this elongation of 600%, and the breaking remaining elongation was calculated. These breaking remaining elongation are also shown in Table 1.

From the results of Table 1, in Examples 1 and 2 in which a matrix material is a crosslinked polymer, a pore is formed in the better state even after dressing. The breaking remaining elongation of matrix materials used in these polishing pads were all 0%, and it can be seen that no elongation after breaking is perceived. It can be seen that the removal rate is as high as 190 to 250 nm/mm. in such the polishing pad.

To the contrary, in Comparative Example 1, a non-crosslinked thermoplastic resin was used as a matrix material. It can be seen that this non-crosslinked thermoplastic resin has the very large breaking remaining elongation of 510% and, therefore, ductility. In addition, a part of pore was choked by dressing. Therefore, the removal rate is 60 nm/mm. being 32% of that in Example 1 and 24% of that in Example 2. On the other hand, in Comparative Example 2, since a matrix material used in Examples 1 and 2 is used as a non-crosslinked material, the sample has not the elastic recovery. For this reason, the breaking remaining elongation is as large as 220%. In addition, a part of pore was choked by dressing. Therefore, the removal rate is 10 nm/min., being 5% of that of Example 1 and 4% of that of Example 2.

What is claimed is:

1. A composition for a polishing pad which comprises a water-insoluble matrix material containing a crosslinked polymer and water-soluble particles dispersed in the water-insoluble matrix material, wherein said water-soluble particles are provided with an outer shell for inhibiting moisture absorption in at least a part of the outermost part, wherein said water-soluble particles are selected from the group consisting of (1) organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, (2) inorganic water-soluble particles comprising at least one material selected from the group consisting of potassium acetate, potassium nitrate, potassium carbonate, potassium bicarbonate, potassium chloride, potassium bromide, potassium phosphate and magnesium nitrate, and (3) mixtures of (1) and (2).

2. The composition for a polishing pad according to claim 1, wherein the amount of said water-soluble particles is 10 to 90% by volume based on 100% by volume as the total amount of said water-insoluble matrix material and said water-soluble particles.

3. A composition for a polishing pad which comprises a water-insoluble matrix material containing a crosslinked polymer and organic water-soluble particles comprising at least one material selected from the group consisting of dextrin, cyclodextrin, mannit, lactose, hydroxpropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, dispersed in the water-insoluble matrix material, wherein the elongation remaining after breaking is 100% or less when a test piece comprising the water-insoluble matrix material is broken at 80° C.

4. A composition for a polishing pad which comprises a water-insoluble matrix material containing a crosslinked polymer and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, dispersed in the water-insoluble matrix material, wherein said water-insoluble matrix material is modified with at least one group selected from the group consisting of an acid anhydride group, a carboxyl group, a hydroxyl group, an epoxy group and an amino group.

5. A composition for a polishing pad which comprises a water-insoluble matrix material containing a crosslinked polymer and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, dispersed in the water-insoluble matrix material, wherein said crosslinked polymer is (I) a crosslinked polymer of rubber selected from the group consisting of 1,2-polybutadiene, butadiene rubber, isoprene rubber, acrylic rubber, acrylonitrile-butadiene rubber, styrene-butadiene rubber, ethylene-propylene rubber, silicone rubber, fluorine rubber and styrene-isoprene rubber, (2) a crosslinked polymer of resin selected from the group consisting of polyethylene and polyvinylidene fluoride, or (3) an ionomer.

6. A composition for a polishing pad which comprises a water-insoluble matrix material containing a crosslinked polymer and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, dispersed in the water-matrix material, wherein the amount of said water-soluble particles is 10 to 90% by volume based on 100% by volume as the total amount of said water-insoluble matrix material and said water-soluble particles.

7. A composition for a polishing pad which comprises a water-insoluble matrix material containing a crosslinked polymer and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, dispersed in the water-insoluble matrix material, wherein said water-soluble particles are provided with an outer shell for inhibiting moisture absorption in an at least a part of the outermost part.

8. The composition for a polishing pad according to claim 7, wherein said outer shell is comprised of at least one material selected from the group consisting of polypeptide, epoxy resin, polyimide, polyamide and polysilicate.

9. A composition for a polishing pad which comprises a water-insoluble matrix material containing a polymer crosslinked by an organic peroxide and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer dispersed in the water-insoluble matrix material, wherein said crosslinked polymer is (1) a crosslinked polymer of rubber selected from the group consisting of 1,2-polybutadiene, butadiene rubber, isoprene rubber, acrylic rubber, acrylonitrile-butadiene rubber, styrene-butadiene rubber, ethylene-propylene rubber, silicone rubber, fluorine rubber and styrene-isoprene rubber, (2) a crosslinked polymer of resin selected from the group consisting of polyethylene and polyvinylidene fluoride, or (3) an ionomer.

10. A composition for a polishing pad which comprises a water-insoluble matrix material containing a polymer crosslinked by an organic peroxide and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer dispersed in the water-insoluble matrix material, wherein said water-insoluble matrix material is modified with at least one group selected from the group consisting of an acid anhydride group, a carboxyl group, a hydroxyl group, an epoxy group and an amino group.

11. A composition for a polishing pad which comprises a water-insoluble matrix material containing a polymer crosslinked by an organic peroxide and organic watersoluble particles comprising at least one material selected from the group consisting of dextrin. cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer dispersed in the water-insoluble matrix material wherein the amount of said water-soluble particles is 10 to 90% by volume based on 100% by volume as the total amount of said water-insoluble matrix material and said water-soluble particles.

12. A composition for a polishing pad which comprises a water-insoluble matrix material containing a polymer crosslinked by an organic peroxide and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer dispersed in the water-insoluble matrix material wherein said water-soluble particles are provided with an outer shell for inhibiting moisture absorption in an at least a part of the outermost part.

13. The composition for a polishing pad according to claim 12, wherein said outer shell is comprised of at least one material selected from the group consisting of polypeptide, epoxy resin, polyimide, polyamide and polysilicate.

14. A composition for a polishing pad which comprises a water-insoluble matrix material containing a crosslinked polymer and water-soluble particles dispersed in the water-insoluble matrix material, wherein said water-soluble particles are provided with an outer shell for inhibiting moisture absorption in at least a part of the outermost part, wherein said crosslinked polymer is (1) a crosslinked polymer of rubber selected from the group consisting of 1,2-polybutadiene, butadiene rubber, isoprene rubber, acrylic rubber, acrylonitrile-butadiene rubber, styrene-butadiene rubber, ethylene-propylene rubber, silicone rubber, fluorine rubber and styrene-isoprene rubber, (2) a crosslinked polymer of resin selected from the group consisting of polyethylene and polyvinylidene fluoride, or (3) an ionomer.

15. A composition for a polishing pad which comprises a water-insoluble matrix material containing a crosslinked polymer and water-soluble particles dispersed in the water-insoluble matrix material, wherein said water-soluble particles are provided with an outer shell for inhibiting moisture absorption in at least a part of the outermost part, wherein said water-insoluble matrix material is modified with at least one group selected from the group consisting of an acid anhydride group, a carboxyl group, a hydroxyl group, an epoxy group and an amino group.

16. A composition for a polishing pad which comprises a water-insoluble matrix material containing a crosslinked polymer and water-soluble particles dispersed in the water-insoluble matrix material, wherein said water-soluble particles are provided with an outer shell for inhibiting moisture absorption in at least a part of the outermost part, wherein said outer shell is comprises of at least one material selected from the group consisting of polypeptide, epoxy resin, polyimide, polyamide and polysilicate.

17. A composition for a polishing pad which comprises a water-insoluble matrix material containing a crosslinked polymer and water-soluble particles dispersed in the water-insoluble matrix material, wherein said water-soluble particles are provided with an outer shell for inhibiting moisture absorption in at least a part of the outermost part, wherein said water-soluble particles have a particle size of 0.1 to 500 $\mu$m.

18. A composition for a polishing pad which comprises a water-insoluble matrix material containing a crosslinked polymer and organic water-soluble particles comprising at least one material selected from the group consisting of dextrin, cyclodextrin, mannit, lactose, hydroxypropylcellulose, methylcellulose, starch, protein, polyvinyl alcohol, polyvinyl pyrrolidone, polyacrylic acid, polyethylene oxide, water-soluble photosensitive resin, sulfonated polyisoprene and sulfonated polyisoprene copolymer, dispersed in the water-insoluble matrix material wherein said water-soluble particles have a particle size of 0.1 to 500 $\mu$m.

* * * * *